United States Patent Office 3,248,334
Patented Apr. 26, 1966

3,248,334
CORROSION INHIBITED AQUEOUS NON-
OXIDIZING ACID COMPOSITIONS
Roger F. Monroe, Tulsa, Okla., assignor to The Dow
Chemical Company, Midland, Mich., a corporation of
Delaware
No Drawing. Original application Apr. 24, 1961, Ser. No.
104,793. Divided and this application Mar. 8, 1962,
Ser. No. 178,272
20 Claims. (Cl. 252—151)

This application is a division of my application Serial No. 104,793, filed April 24, 1961, entitled, "Acetylenic Compounds."

The present invention relates to new and useful compositions of matter and more particularly concerns the new class of compounds represented by the formulas:

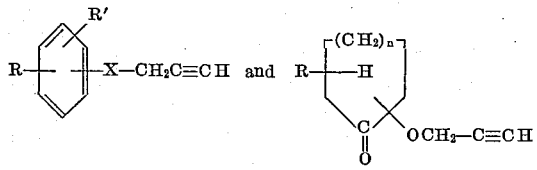

wherein X represents oxygen or sulfur; R represents a member selected from the group consisting of hydrogen, alkyl having from 1 to 4 carbon atoms, alkoxy having from 1 to 4 carbon atoms, and halogen having an atomic number from 17 to 35, inclusive; R' represents a member selected from the group consisting of R and

and $n$ represents an integer from 0 to 1. The new compounds are useful as the active ingredient in aqueous non-oxidizing acids for preventing corrosion of metals in contact with said acid.

The novel compounds of the present invention can be prepared by reacting a phenol, thiophenol, or hydroxy cyclic ketone or their substituted derivatives, having no other reactive groups, with a propargyl halide, e.g., bromide or chloride, at an elevated temperature in the presence of an acid acceptor. The reaction proceeds readily when carried out in the presence of an inert organic solvent and the temperature of the reaction is conveniently about the reflux temperature of the solvent. Good results are obtained when the reactants and acid acceptor are employed in substantially equivalent amounts. However, some of the desired product is produced when other than equivalent amounts of reactants are employed.

The organic compounds which can be employed in making the compounds of the present invention are those having the general formulas:

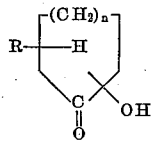

wherein X, R, and R' have the same significance as in the previous formulas. Thus, one can employ, for example, the hydroxyarylaldehydes, such as o-hydroxybenzaldehyde, p-hydroxybenzaldehyde, m-hydroxybenzaldehyde, 2-hydroxy-4-methoxybenzaldehyde, 3-hydroxy-4-methoxybenzaldehyde, 4-hydroxy-3 - methoxybenzaldehyde, as well as their alkyl- and halo-substituted derivatives, such as 4-hydroxy-2-chlorobenzaldehyde, 4-hydroxy-3-bromobenzaldehyde, 2-methyl-4-hydroxybenzaldehyde, and the like. Further, one can employ phenol, the alkylphenols, such as the cresols and the butylphenols, the alkoxyphenols, such as 4-ethoxyphenol, the alkyl-, alkoxy-, or halo-substituted hydroxycycloaliphatic ketones having from 5 to 6 carbon atoms in the ring, such as 2-hydroxy-3 - methylcyclopentanone, 2-hydroxy-3-methylcyclohexanone, and the like. Also, one can employ the thiophenols and the mercaptoarylaldehydes, such as thiophenol, methylthiophenol, p-mercaptobenzaldehyde, 2-methyl-4-mercaptobenzaldehyde, as well as their halogenated derivatives.

It is to be understood that substantially any acid acceptor can be employed, such as the amines, the alkali and alkaline earth, hydroxides, carbonates, and the like.

Organic solvents which can be employed in carrying out the present invention are those inert under the conditions of reaction and include, for example, acetone, toluene, xylene, methyl ethyl ketone, and the like.

Propargyl bromide or propargyl chloride can be employed as the acetylenic donating reactant.

The following examples illustrate the present invention but are not to be construed as limiting.

Example 1

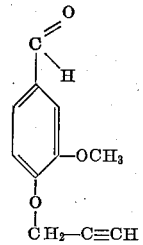

A mixture of 152 grams (1 mole) of 3-methoxy-4-hydroxybenzaldehyde (vanillin), 119 grams (1 mole) of propargyl bromide, 140 grams (1 mole) of potassium carbonate and 400 ml. of acetone was heated on a steam bath for 7 hours. Thereafter, on cooling to room temperature, water was added, and the oil layer which formed was separated from the aqueous layer. The oil layer crystallized on standing and the resulting crystals were recrystallized from ethanol to yield a yellow crystalline solid melting at 90–93° C. The product was identified as 3-methoxy-4-propargyloxybenzaldehyde.

Example 2

In the manner of Example 1, employing 4-hydroxybenzaldehyde in place of 3-methoxy-4-hydroxybenzaldehyde, there was obtained on recrystallization from ethanol a crystalline product melting at 79° C. The product was identified as 4-propargyloxybenzaldehyde.

Example 3

In a manner of Example 1, employing 3-hydroxybenzaldehyde in place of 3-methoxy-4-hydroxybenzaldehyde, there was obtained a product on recrystallization from ethanol identified as 3-propargyloxybenzaldehyde melting at 67–71° C.

Example 4

A mixture of 138 grams of 4-ethoxyphenol, 109 grams of propargyl bromide, 140 grams of dry potassium carbonate, and 400 ml. of acetone was heated on a steam bath for 7 hours. On cooling, water was added and the oil layer was separated from the aqueous layer. Upon standing, the oil layer crystallized. The crystalline product 1-ethoxy-4-propargyloxybenzene was recrystallized from ethanol and found to have a melting point of 60° C.

Example 5

In the manner of Example 1, employing 2-hydroxy-3-methylcyclopentanone in place of 3-methoxy-4-hydroxybenzaldehyde, there was obtained on recrystallization from ethanol a crystalline product identified as 2-propargyloxy-3-methylcyclopentanone.

*Example 6*

In the manner of Example 1, employing o-methylthiophenol (in place of vanillin), there is obtained a product identified as o-tolyl propargyl thioether. Other propargyl ethers and thioethers prepared in a manner similar to those above include 1,2-dipropargyloxybenzene (from resorcinol), p-tolyl propargyl ether, m-tolyl propargyl ether, p-tolyl propargyl thioether, m-tolyl propargyl thioether.

The new compounds have been tested and found to be useful as the active ingredient in compositions of matter useful in preventing the corrosion of metals in contact with non-oxidizing acids. In a representative operation, the addition of 0.8 percent by weight of 4-propargyloxybenzaldehyde or 3-propargyloxybenzaldehyde to aqueous 15 percent hydrochloric acid reduced the corrosion of mild steel N 80 in contact with said acid at temperatures of 200° F. to less than 0.009 lb. per square foot per day.

The corrosion tests were conducted at temperatures up to 210° F. as follows: 100 ml. of a 15 percent by weight aqueous hydrochloric acid solution is placed in a small bottle and the desired concentration of inhibitor mixed in (inhibitor concentration is expressed in percent by volume). The solution is placed in a constant temperature bath and brought to the test temperature. A clean, weighed metal test coupon either AISI 1020 sheet steel (2.75" x 1.0" x 0.12") or an N 80 carbon steel (a 1" wide quarter segment of a 2.375" O.D. pipe, 0.187" wall thickness) is placed in the heated solution and left for a period of time, usually 6 to 16 hours. After this time, the test coupons are removed from the test solution, scrubbed with a toothbrush to remove loose corrosion products, dried and reweighed. From a knowledge of the metal weight loss, surface area of specimen and the length of test, the corrosion rate is calculated in units of pounds per square foot per day. The results of such tests are set forth in the table below.

TABLE I

| Example No. | Concentration Inhibitor (Percent by volume) | Type Metal | Length of test (hrs.) | Temp. of test (° F.) | Corrosion Rate, Corrosion lbs./ft.2/day |
|---|---|---|---|---|---|
| 7 | 0.4 p-propargyloxybenzaldehyde. | N 80 | 16 | 200 | 0.0077 |
| 8 | 0.4 3-methoxy-4-propargyloxybenzaldehyde. | N 80 | 16 | 200 | 0.57 |
| 9 | 0.8 3-methoxy-4-propargyloxybenzaldehyde. | N 80 | 16 | 200 | 0.46 |
| 10 | 0.8 1-ethoxy-4-propargyloxybenzene. | N 80 | 16 | 200 | 0.004 |
| 11 | 0.4 2-propargyloxy-3-methylcyclopentanone. | 1020 | 6 | 150 | 0.0038 |
| 12 | 0.4 phenyl propargyl thioether. | 1020 | 16 | 175 | 0.0011 |
| 13 | 0.4 m-tolyl propargyl thioether. | 1020 | 16 | 175 | 0.0026 |
| 14 | 0.4 o-tolyl propargyl thioether. | 1020 | 16 | 200 | 0.049 |
| 15 | 0.4 1,2-dipropargyloxybenzene. | 1020 | 16 | 200 | 0.0089 |
| 16 | 0.4 m-tolyl propargyl ether. | 1020 | 16 | 200 | 0.0057 |
| 17 | 0.4 p-tolyl propargyl ether. | 1020 | 16 | 200 | 0.0034 |
| 18 | 0.4 o-tolyl propargyl ether. | 1020 | 16 | 200 | 0.0054 |
| 19 | 0.8 o-tolyl propargyl ether. | N 80 | 16 | 200 | 0.037 |
| 20 | 0.4 o-tolyl propargyl ether. | N 80 | 16 | 200 | 0.19 |
| 21 | No inhibitor. | N 80 | 1 | 200 | >1.0 |

It is to be understood that HCl is only representative of many other non-oxidizing acids which can be inhibited to prevent corrosion of metal in contact with aqueous solutions. Thus, for example, phosphoric acid, sulfuric acid, acetic acid, and the like are similarly inhibited.

I claim:
1. A corrosion inhibited aqueous non-oxidizing acid containing, as the essential corrosion inhibitor therefor, an effective amount of a cyclic compound having one of the formulas:

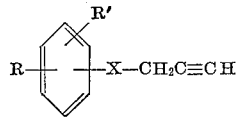

and

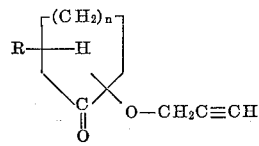

wherein X represents a member selected from the group consisting of oxygen and sulfur; R represents a radical selected from the group consisting of hydrogen, alkyl radicals having from 1 to 4 carbon atoms, alkoxy radicals having from 1 to 4 carbon atoms, and halogen having an atomic number from 17 to 35, inclusive; R' represents a member selected from the group consisting of R and

and *n* represents an integer from 0 to 1.

2. A method for preventing the corrosion of metals in contact with aqueous solutions of non-oxidizing acids which consists essentially of introducing into said solutions, as the essential corrosion inhibitor therefor, an effective amount of a compound having one of the formulas:

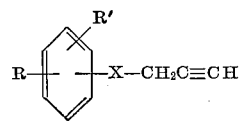

and

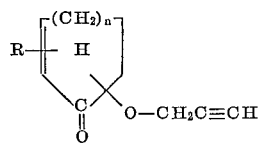

wherein X represents a member selected from the group consisting of oxygen and sulfur; R represents a radical selected from the group consisting of hydrogen, alkyl radicals having from 1 to 4 carbon atoms, alkoxy radicals having from 1 to 4 carbon atoms, and halogen having an atomic number from 17 to 35, inclusive; R' represents a member selected from the group consisting of R and

and *n* represents an integer from 0 to 1.

3. The corrosion inhibited acid composition set forth in claim 1 wherein said inhibitor is an alkoxypropargyloxybenzaldehyde, said alkoxy moiety having from 1 to 4 carbon atoms.

4. The acid composition of claim 3 wherein said corrosion inhibitor is 3-methoxy-4-propargyloxybenzaldehyde.

5. The aqueous acid composition of claim 1 wherein said corrosion inhibitor is 4-propargyloxybenzaldehyde.

6. The aqueous acid composition of claim 1 wherein said corrosion inhibitor is 3-propargyloxybenzaldehyde.

7. The corrosion inhibited acid composition of claim 1 wherein said inhibitor is an alkoxypropargyloxybenzene, said alkoxy moiety having from 1 to 4 carbon atoms.

8. The aqueous acid composition of claim 1 wherein said corrosion inhibitor is alkoxy-4-propargyloxybenzaldehyde, said alkoxy moiety having from 1 to 4 carbon atoms.

9. The corrosion inhibited acid composition of claim 1 wherein said inhibitor is an alkylphenyl propargyl thioether, said alkyl moiety having from 1 to 4 carbon atoms.

10. The aqueous acid composition of claim 1 wherein said corrosion inhibitor is o-tolyl propargyl thioether.

11. The corrosion inhibited acid composition of claim 1 wherein said inhibitor is phenyl propargyl thoether.

12. The aqueous acid composition of claim 1 wherein said corrosion inhibitor is methyl phenyl propargyl thioether.

13. The corrosion inhibited acid composition of claim 1 wherein said inhibitor is phenyl propagyl thioether. ether, said alkyl moiety having from 1 to 4 carbon atoms.

14. The aqueous acid composition of claim 1 wherein said corrosion inhibitor is m-tolyl propargyl ether.

15. The aqueous acid composition of claim 1 wherein said corrosion inhibitor is p-tolyl propargyl ether.

16. A corrosion inhibited aqueous non-oxidizing acid containing as the essential corrosion inhibitor 1,2-di(propargyloxy)benzene.

17. The corrosion inhibited acid composition of claim 1 wherein said inhibitor is a proparyloxy alkyl cyclopentanone, said alkyl moiety having from 1 to 4 carbon atoms.

18. The aqueous acid composition of claim 1 wherein said corrosion inhibitor is 2-propargyloxy-3-methylcyclopentanone.

19. The acid composition of claim 1 wherein said acid is HCl.

20. The acid composition of claim 1 wherein said inhibitor is employed in an amount of from about 0.4 to about 0.8% by volume of the aqueous acid solution.

References Cited by the Examiner

UNITED STATES PATENTS 2,952,509  9/1960  Monroe _____ 252—146
2,993,864  7/1961  Monroe et al. ____ 252—396 XR

OTHER REFERENCES

Foster et al., "Acetylenic Corrosion Inhibitors," Ind. and Eng. Chem., vol. 51, No. 7, July 1959, pp. 825–28.

Powell et al., Journal Am. Chem. Soc., vol. 42 (1920), pages 646–58.

Reppe et al., Annalen der Chemie, vol. 596 (1955), pages 75–76.

Wagner et al., Synthetic Organic Chemistry (1953), John Wiley & Sons Inc., pages 226, 227, 240, 268–9, 297, 305.

JULIUS GREENWALD, *Primary Examiner.*